United States Patent
Lee et al.

(10) Patent No.: US 9,529,561 B2
(45) Date of Patent: Dec. 27, 2016

(54) DISPLAY DEVICE, MULTI-DISPLAY DEVICE INCLUDING THE SAME, AND METHOD FOR DRIVING THE SAME

(71) Applicant: SAMSUNG DISPLAY CO., LTD., Yongin, Gyeonggi-Do (KR)

(72) Inventors: Seok Hwan Lee, Seoul (KR); Dae-Sik Lee, Asan-si (KR); Hwan Woong Lee, Asan-si (KR); Seung Young Choi, Yongin-si (KR)

(73) Assignee: SAMSUNG DISPLAY CO., LTD., Yongin, Gyeonggi-Do (KR)

( * ) Notice: Subject to any disclaimer, the term of this patent is extended or adjusted under 35 U.S.C. 154(b) by 0 days.

(21) Appl. No.: 14/452,692

(22) Filed: Aug. 6, 2014

(65) Prior Publication Data
US 2015/0187286 A1 Jul. 2, 2015

(30) Foreign Application Priority Data
Dec. 30, 2013 (KR) ........................ 10-2013-0167493

(51) Int. Cl.
G09G 5/10 (2006.01)
G06F 3/14 (2006.01)
G09G 3/34 (2006.01)

(52) U.S. Cl.
CPC ............. *G06F 3/1423* (2013.01); *G09G 3/342* (2013.01); *G09G 3/3406* (2013.01); *G09G 2320/0233* (2013.01); *G09G 2360/145* (2013.01)

(58) Field of Classification Search
CPC ............... G06F 3/1423; G09G 3/3406; G09G 2320/0233
USPC .................................................... 345/89, 690
See application file for complete search history.

(56) References Cited

U.S. PATENT DOCUMENTS

| 7,542,056 | B2* | 6/2009 | Oh ........................ G09G 3/3611 345/102 |
| 8,421,361 | B2* | 4/2013 | Chen .................. H05B 33/0842 315/151 |
| 2004/0036697 | A1* | 2/2004 | Kim ...................... G06F 3/1431 345/617 |
| 2006/0232216 | A1* | 10/2006 | Kosaka ................ G09G 3/3406 315/169.2 |

(Continued)

FOREIGN PATENT DOCUMENTS

| JP | 2012-123085 | 6/2012 |
| JP | 2013-080045 | 5/2013 |

(Continued)

*Primary Examiner* — Chanh Nguyen
*Assistant Examiner* — Yuzhen Shen
(74) *Attorney, Agent, or Firm* — F. Chau & Associates, LLC

(57) ABSTRACT

A display device is provided. The display device includes a display panel, a backlight unit, and a luminance comparison unit. The backlight unit is configured to supply light to the display panel. The luminance comparison unit is configured to compare a measured luminance of the display panel with a reference luminance range. The backlight unit includes a light source unit, a DC-DC converter, and a driving current controller. The DC-DC converter is configured to supply a driving voltage to the light source unit, and the driving current controller is configured to control a driving current flowing to the light source unit based on the comparison result of the luminance comparison unit.

17 Claims, 8 Drawing Sheets

(56) References Cited

U.S. PATENT DOCUMENTS

| | | | | |
|---|---|---|---|---|
| 2008/0252629 | A1* | 10/2008 | Chiang | G09G 3/20 345/207 |
| 2009/0021183 | A1 | 1/2009 | Ye et al. | |
| 2009/0184664 | A1* | 7/2009 | Jeong | G09G 3/342 315/297 |
| 2010/0283773 | A1* | 11/2010 | Kim | G09G 3/20 345/211 |
| 2011/0095965 | A1* | 4/2011 | Yoneoka | G06F 3/1446 345/1.1 |
| 2012/0019167 | A1* | 1/2012 | Chen | H05B 33/0842 315/307 |

FOREIGN PATENT DOCUMENTS

| | | |
|---|---|---|
| JP | 2013-097205 | 5/2013 |
| KR | 100090944 | 8/1995 |
| KR | 100493297 | 5/2005 |
| KR | 100628153 | 9/2006 |
| KR | 1020100117257 | 11/2010 |
| KR | 1020120135946 | 12/2012 |

\* cited by examiner

DISPLAY DEVICE, MULTI-DISPLAY DEVICE INCLUDING THE SAME, AND METHOD FOR DRIVING THE SAME

CROSS-REFERENCE TO RELATED PATENT APPLICATION

This patent application claims priority under 35 U.S.C. §119 to Korean Patent Application No. 10-2013-0167493, filed on Dec. 30, 2013 in the Korean Intellectual Property Office, the disclosure of which is incorporated by reference herein in its entirety.

TECHNICAL FIELD

The present invention relates to a display device, a multi-display device including the same, and a method for driving the same. More particularly, the present invention relates to a display device for uniformly controlling a luminance characteristic, a multi-display device including the same, and a method for driving the same.

DISCUSSION OF THE RELATED ART

A display device has been widely used as a computer monitor, a television, a mobile phone, or the like.

The display device may require a light source such as a backlight unit when it is not self emissive. The light source includes a light emitting diode (LED), a cold cathode fluorescent lamp (CCFL), an external electrode fluorescent lamp (EEFL), or the like. A luminance of the light source may depend on a driving current of the light source.

However, luminance values of a plurality of display devices may be different although the light sources of the plurality of display devices are driven by the same amount of driving current.

SUMMARY

According to an exemplary embodiment of the present invention, a display device is provided. The display device includes a display panel, a backlight unit, and a luminance comparison unit. The backlight unit is configured to supply light to the display panel. The luminance comparison unit is configured to compare a measured luminance of the display panel with a reference luminance range. The backlight unit includes a light source unit, a DC-DC converter, and a driving current controller. The TXC-DC converter is configured to supply a driving voltage to the light source unit. The driving current controller is configured to control a driving current flowing to the light source unit based on the comparison result of the luminance comparison unit.

When the measured luminance is within the reference luminance range, the driving current controller may be configured to maintain the driving current, and when the measured luminance is out of the reference luminance range, the driving current controller may be configured to change the driving current.

The driving current controller may be configured to decrease the driving current when the measured luminance is higher than a highest value of the reference luminance range, and the driving current controller may be configured to increase the driving current when the measured luminance is lower than a lowest value of the reference luminance range.

The luminance comparison unit may include a lookup table having an amount of the driving current change depending on a difference between the measured luminance and the reference luminance range.

The luminance comparison unit may be configured to transmit a first value corresponding to the amount of the driving current change to the driving current controller based on the lookup table when the measured luminance is out of the reference luminance range.

The driving current controller may include a plurality of resistors and a plurality of coupling members. The plurality of coupling members may be connected to a plurality of resistors and may be configured to control connection states of the resistors.

Each of the coupling members may be a switch.

The driving current controller may include a digital block configured to receive the first value as a digital value.

The driving current controller may include a digital variable resistor configured to control a resistance based on the amount of the driving current change.

The light source unit may include one or more light emitting diodes (LEDs).

The one or more LEDs may be arranged in series.

The display device may further include a luminance measuring unit. The luminance measuring unit may be configured to measure the luminance of the display panel and to provide the measured luminance to the luminance comparison unit.

The luminance comparison unit may be disposed in the backlight unit.

The display device may further include a signal controller configured to generate a control signal to drive the display panel, and the luminance comparison unit may be disposed in the signal controller.

According to an exemplary embodiment of the present invention, a multi-display device is provided. The multi-display device includes a plurality of display devices disposed adjacent to each other. Each of the display devices includes a display panel, a backlight unit, and a luminance comparison unit. The backlight unit is configured to supply light to the display panel. A luminance comparison unit is configured to compare a measured luminance of the display panel with a reference luminance range. The backlight unit includes a light source unit, a DC-DC converter, and a driving current controller. The DC-DC converter is configured to supply a driving voltage to the light source unit, and the driving current controller is configured to control a driving current flowing to the light source unit based on the comparison result of the luminance comparison unit.

The plurality of display devices may have the same reference luminance range.

The luminance comparison units of the plurality of display devices may be connected to each other to share the same reference luminance range.

According to an exemplary embodiment of the present invention, a method for driving a display device is provided. The method includes receiving a measured luminance of the display panel, determining whether the measured luminance is included within a reference luminance range, maintaining a driving current flowing to a light source unit in the display device when the measured luminance is included in the reference luminance range, and changing the driving current when the measured luminance is out of the reference luminance range.

The driving current may be decreased when the measured luminance is higher than a highest value of the reference luminance range, and the driving current may be increased when the measured luminance is lower than a lowest value of the reference luminance range.

The method may further include calculating an amount of the driving current change based on a difference between the measured luminance and the reference luminance range.

According to an exemplary embodiment of the present invention, a display device is provided. The display device includes a luminance comparison unit and a backlight unit. The luminance comparison unit is configured to compare a measured luminance of the display device with a reference luminance range. The backlight unit is configured to supply light to a display panel. The backlight unit includes a light source unit and a driving current controller. The driving current controller is configured to control a driving current flowing to the light source unit based on the comparison result of the luminance comparison unit.

The luminance comparison unit may be a calculator configured to calculate an amount of the driving current change.

BRIEF DESCRIPTION OF THE DRAWINGS

The above and other features of the present invention will become more apparent by describing in detail exemplary embodiments thereof with reference to the accompanying drawings of which.

DETAILED DESCRIPTION OF THE EMBODIMENTS

Figure 1:
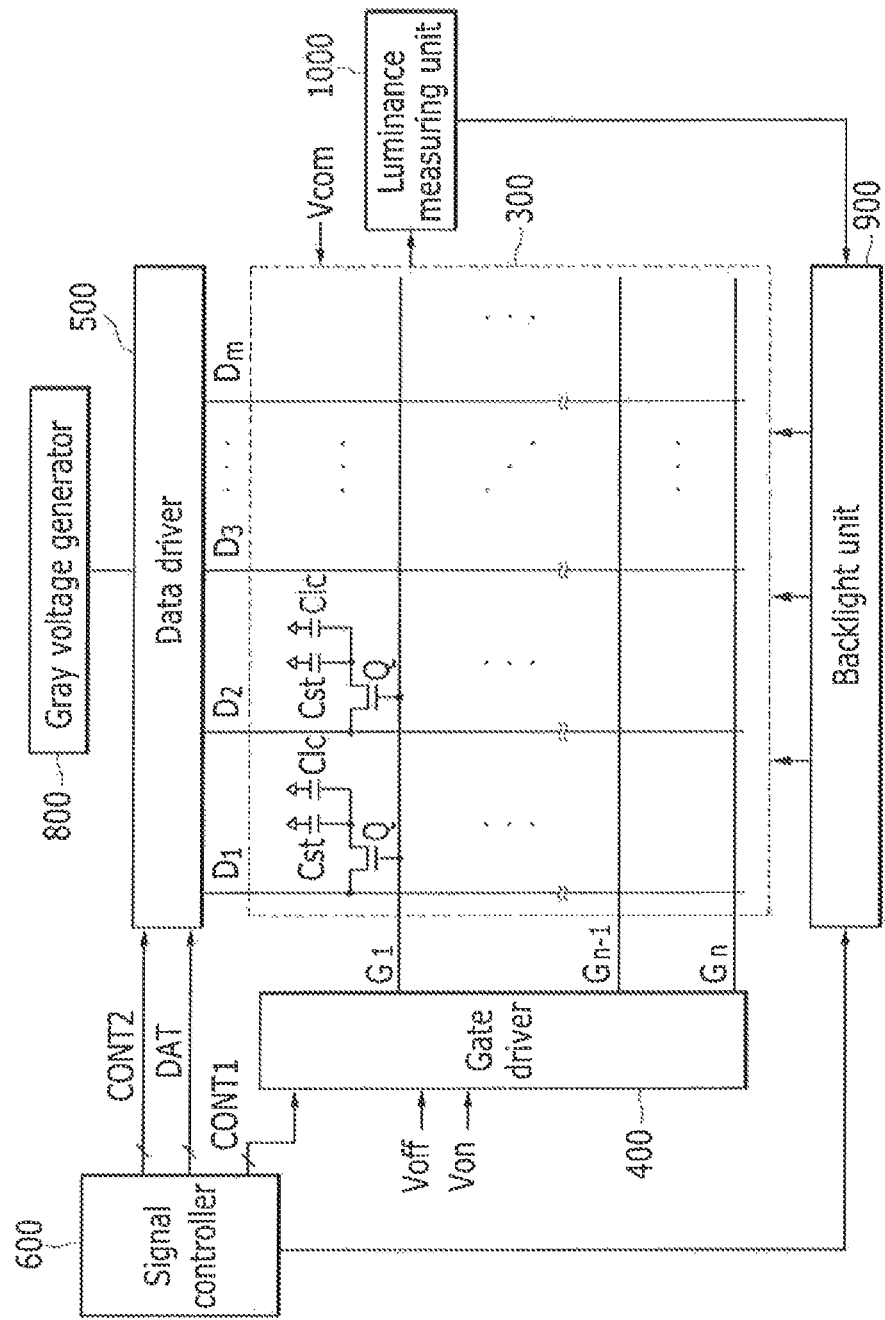
FIG. 1 is a block diagram of a display device according to an exemplary embodiment of the present invention.

Exemplary embodiments of the present invention will be described more fully hereinafter with reference to the accompanying drawings. The present invention may, however, be embodied in various different and should not be construed as being limited to the embodiments set forth herein.

In the drawings, the thickness of layers, films, panels, regions, etc., may be exaggerated for clarity. Like reference numerals may designate like elements throughout the specification and drawings.

Firstly, a display device according to an exemplary embodiment of the present invention will be described with reference to FIGS. 1 and 2.

Figure 2:
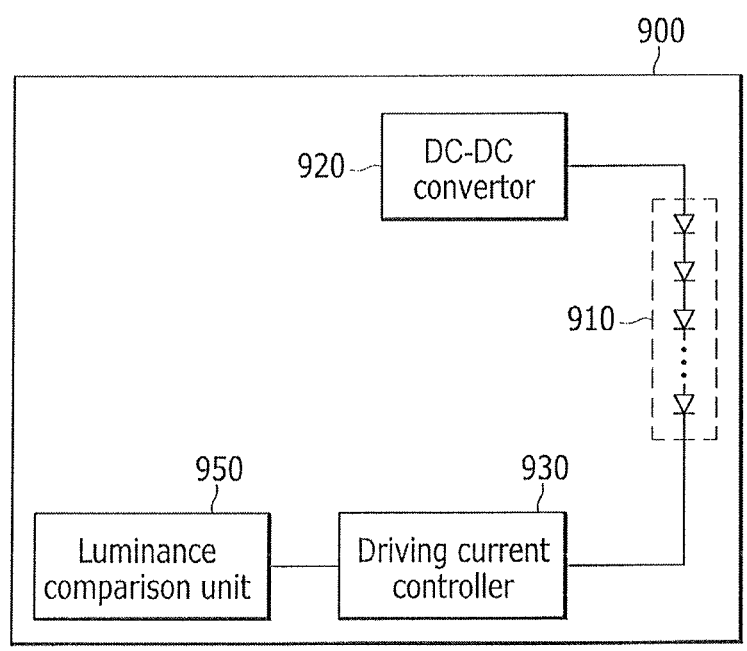
FIG. 2 is a block diagram of a backlight unit of a display device according to an exemplary embodiment of the present invention.

FIG. 1 is a block diagram of a display device according to an exemplary embodiment of the present invention, and FIG. 2 is a block diagram of a backlight unit of a display device according to an exemplary embodiment of the present invention.

A display device according to an exemplary embodiment of the present invention, as shown in FIG. 1, includes a display panel 300 for displaying an image, a signal controller 600 for controlling signals for driving the display panel 300, and a backlight unit 900 for supplying light to the display panel 300.

The display panel 300 includes a plurality of gate lines G1-Gn and a plurality of data lines D1-Dm, the plurality of gate lines G1-Gn may extend in a horizontal direction, and the plurality of data lines D1-Dm may extend in a vertical direction crossing the plurality of gate lines G1-Gn.

Each of the gate lines G1 to Gn and each of the data lines D1 to Dm is connected with each pixel, and a switching element Q connected with the gate lines G1 to Gn and the data lines D1 to Dm is included in each pixel. A control terminal of the switching element Q is connected with the gate lines G1 to Gn, an input terminal thereof is connected with the data lines D1 to Dm, and an output terminal thereof is connected with a liquid crystal capacitor Clc and a storage capacitor Cst.

The display panel 300 of FIG. 1 is shown as a liquid crystal panel, but the display panel 300 applied with the present invention may be various other display panels, an organic light emitting panel, an electrophoretic display panel, a plasma display panel, or the like.

The signal controller 600 processes image data DAT and a control signal thereof to be suitable for an operation condition of the liquid crystal panel 300 in response to the image data DAT and the control signal thereof, for example, a vertical synchronization signal Vsync, a horizontal synchronizing signal Hsync, a main clock signal MCLK, a data enable signal DE, or the like, and then generates and outputs a gate control signal CONT1 and a data control signal CONT2.

The gate control signal CONT1 includes a vertical synchronization start signal STV instructing a start of an output of a gate-on pulse (e.g., a high section of the gate signal GS), a gate clock signal CPV controlling an output time of the gate-on pulse, or the like.

The data control signal CONT2 includes a horizontal synchronization start signal STH instructing a start of an input of the image data DAT, a load signal TP for applying the corresponding data voltage to the data line D1-Dm, or the like.

The backlight unit 900 supplies the light to the display panel 300 and the supplied light displays an image when the light passes through the display panel 300.

As shown in FIG. 2, the backlight unit 900 includes a light source unit 910, a DC-DC converter 920 that supplies a driving voltage to the light source unit 910, a driving current controller 930 that controls a driving current flowing to the light source unit 910, and a luminance comparison unit 950 that compares a measured luminance of the display panel 300 with a reference luminance range.

The light source unit 910 may include at least one light emitting member. The light emitting member may be made of a light emitting diode (LED). The light source unit 910 may include a plurality of LEDs arranged in series, as shown in FIG. 2. In addition, the light source unit 910 may be formed of a shape in which several LED columns are connected.

The light emitting member is not limited to the LED and may be made of a cold cathode fluorescent lamp (CCFL) or an external electrode fluorescent lamp (EEFL). Further, the light source unit 900 is classified into a side light type and a direct light type according to a layout form thereof. In a case of the side light type, the light source unit 910 is disposed at one edge of the display panel 300 to transmit the light to the other edge thereof through a light guide. In a case of the direct light type, the light source unit 910 is uniformly disposed at the entire lower side of the display panel 300 to supply the light to the display panel 300.

The DC-DC converter 920 receives the input voltage to generate the driving voltage and transmits the driving voltage to one end of the light source unit 910. For example, the DC-DC converter 920 may be a boost converter that receives a DC input voltage and outputs a DC driving voltage having a high DC level.

The driving current controller 930 controls the driving current flowing to the light source unit 910 according to the comparison result of the luminance comparison unit 950. When the measured luminance of the display panel 300 is included in the reference luminance range, the driving current controller 930 maintains the driving current in the current state. In addition, when the measured luminance is outside the reference luminance range, the driving current controller 930 changes the driving current. For example, when the measured luminance is higher than a highest value of the reference luminance range, the driving current controller 930 decreases the driving current to lower the luminance of the display panel 300. In addition, when the measured luminance is lower than a lowest value of the reference luminance range, the driving current controller 930 increases the driving current to increase the luminance of the display panel 300. For example, when the measured luminance is deviated from the reference luminance range, the luminance of the display panel 300 is changed by controlling the driving current and thus, the luminance of the display panel 300 may be within the reference luminance range.

The luminance comparison unit 950 compares the measured luminance of the display panel 300 with the reference luminance range to determine whether the measured luminance is within the reference luminance range. For example, the luminance comparison unit 950 may include a lookup table, as shown in Table 1.

TABLE 1

| Reference luminance (gray) (reference luminance range) | | 550 (525-575) | | | |
|---|---|---|---|---|---|
| Measured luminance (gray) | 425-475 | 475-525 | 525-575 | 575-625 | 625-675 |
| Driving current change amount (mA) | +40 | +20 | 0 | −20 | −40 |

Table 1 shows that an amount of the driving current change depends on a difference between the measured luminance and the reference luminance range. For example, when a reference luminance is 550, the reference luminance range may be configured as a range of 525 to 575. Thus, when the measured luminance is within a range of −25 to +25 from the reference luminance (e.g., 550), a luminance of the display panel 300 may be recognized to be normal. When the measured luminance is out of this reference luminance range (e.g., 525 to 575), the driving current is changed to change the luminance of the display panel 300. For example, when the measured luminance is in a range of 475 to 525, the measured luminance may be determined to be out of the reference luminance range, and the amount of the driving current change may be +20 mA. The luminance comparison unit 950 transmits information including the amount of the driving current change to the driving current controller 930, and the driving current controller 930 increases the driving current based on this information. For example, when the measured luminance is in a range of 625 to 675, the measured luminance may be determined to be out of the reference luminance range, and the amount of the driving current change may be −40 mA. The luminance comparison unit 950 transmits information including the amount of the driving current change to the driving current controller 930, and the driving current controller 930 decreases the driving current based on this information.

This lookup table is only one example, and the lookup table having the amount of the driving current change according to the measured luminance and the reference luminance range may be changed in various forms and values. For example, the amount of the driving current change may be clanged variously by further minutely pre-determining the range of the measured luminance.

The luminance comparison unit 950 may include a calculator having a predetermined function instead of the lookup table. For example, when the difference between the measured luminance and the reference luminance is calculated and the difference between the measured luminance and the reference luminance is larger than a predetermined value, the amount of the driving current change may be calculated by the function of the calculator.

The luminance comparison unit 950 is described as being included in the backlight unit 900, however the present invention is not limited thereto. For example, the luminance comparison unit 950 may be included in the DC-DC converter 920 of the backlight unit 900 or the driving current controller 930 of the backlight unit 900. In addition, the luminance comparison unit 950 may be included in the signal controller 600 instead of the backlight unit 900.

Referring back to FIG. 1, the display device according to an exemplary embodiment of the present invention may further include a luminance measuring unit 1000.

The luminance measuring unit 1000 measures the luminance of the display panel 300 from an amount of light that is emitted into the front of the display panel 300. The luminance measuring unit 1000 provides a measurement result therefrom to the luminance comparison unit 950. The luminance measuring unit 1000 may be connected directly to the luminance comparison unit 950 to transmit the measurement result, or a wireless communication may be used to transmit the measurement result.

The driving current of the light source unit 910 to obtain the reference luminance of the display panel 300 may be predetermined. Although the driving current is predetermined as described above, the actually measured luminance may be different from the reference luminance by many variations generated in a manufacturing process of the display device. Accordingly, the luminance is actually measured through the luminance measuring unit 1000 and is compared with the reference luminance, and when the difference between the measured luminance and the reference luminance is generated, the actual luminance of the display panel 300 may be controlled to be similar to the reference luminance by changing the corresponding driving current.

The luminance measuring unit 1000 may be included in the display device. When the display device is used, the luminance of the display panel 300 may be changed, and at this time, the luminance of the display panel 300 may be measured through the luminance measuring unit 1000, and the driving current flowing to the light source unit 910 may be controlled depending on the amount of the changed luminance, thereby controlling the actual luminance of the display panel 300 to be similar to the reference luminance.

However, the present invention is not limited thereto, and the luminance measuring unit 1000 might not exist when the display device is completed as a product or is shipped. For example, when the display device is tested, the actual luminance and the reference luminance may be compared with each other to control the driving current flowing to the light source unit 910, and the driving current may be set to be fixed without the control of the driving current thereafter. Thus, the luminance measuring unit 1000 may not be included in the display device, and even if it is included therein, the luminance measuring unit 1000 may be removed in the shipping step.

Referring back to FIG. 1, the display device according to an exemplary embodiment of the present invention may further include a gate driver 400 for driving the gate lines G1-Gn and a data driver 500 for driving the data lines D1-Dm.

A plurality of gate lines G1-Gn of the display panel 300 are connected to the gate driver 400, and the gate driver 400 alternately applies the gate-on voltage Von and the gate-off voltage Voff to the gate lines C1-Gn according to the gate control signal CONTI1 applied to the signal controller 600.

The display panel 300 may be formed of two substrates which face each other and are bonded to each other, and the gate driver 400 may be formed to be attached to one edge of the display panel 300. Further, the gate driver 400 may be mounted in the display panel 300 together with the gate lines CG1 to Gn, the data lines D1 to Dm, and the switching element Q. For example, the gate driver 400 may be formed in a process of forming the gate lines G1 to Gn, the data lines D1 to Dm, and the switching element Q.

The plurality of data lines D1 to Dm of the display panel 300 are connected with the data driver 500, and the data driver 500 receives the data control signal CONT2 and the image data DAT from the signal controller 600. The data driver 500 converts the image data DAT to a data voltage by using a gray voltage generator 800, and transfers the converted data voltage to the data lines D1 to Dm.

Hereinafter, a method for driving a display device according to an exemplary embodiment of the present invention will be described with reference to FIG. 3 in addition to FIGS. 1 and 2.

Figure 3:
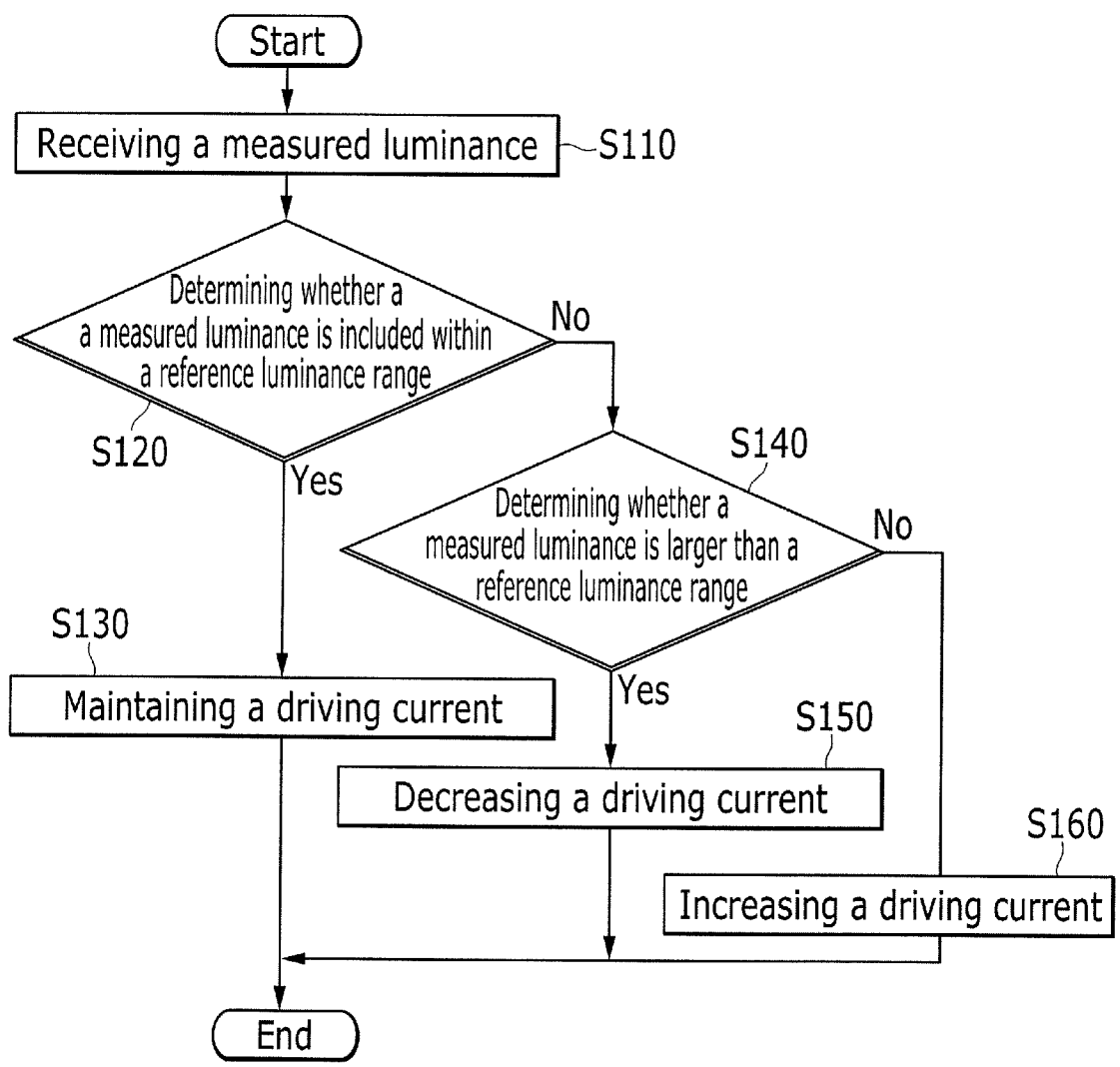
FIG. 3 is a flowchart of a method for driving a display device according to an exemplary embodiment of the present invention.

FIG. 3 is a flowchart of a method for driving a display device according to an exemplary embodiment of the present invention.

Firstly, the luminance comparison unit 950 receives the measured luminance (S110). For example, the luminance of the display panel 300 is measured and a measured result is transmitted to the luminance comparison unit 950.

The luminance comparison unit 950 determines whether the measured luminance is included in the reference luminance range (S120)

When the measured luminance is included in the reference luminance range, the luminance of the display panel 300 may not be changed since the display panel 300 displays with a desired luminance.

Accordingly, the driving current of the light source unit 910 is maintained (S130).

When the measured luminance is out of the reference luminance range, the luminance of the display panel 300 may be changed since the display panel 300 does not display with a desired luminance.

In this case, the luminance comparison unit 950 determines whether the measured luminance is higher than a highest value of the reference luminance range (S140).

When the measured luminance is higher than the highest value of the reference luminance range, the driving current of the light source unit 910 is decreased (S150).

When the measured luminance is lower than a lowest value of the reference luminance range, the driving current of the light source unit 910 is increased (S160).

In the steps S150 and S160, when the driving current of the light source unit 910 is decreased or increased, an amount of the increased driving current or an amount of the decreased driving current is determined according to a difference of the measured luminance and the reference luminance range. For example, as the difference between the measured luminance and the reference luminance range becomes larger, the amount of the driving current change may be increased. The luminance comparison unit 950 may determine the amount of the driving current change based on the difference of the measured luminance and the reference luminance range when the measured luminance is out of the reference luminance range. In this case, the luminance comparison unit 950 may use the lookup table, e.g., as shown in Table 1 or an element having the function to calculate the amount of the driving current change. For example, the element having the function may include a calculator.

Hereinafter, a method for increasing or decreasing the driving current will be described with referenced to FIGS. 4 to 7.

FIGS. 4 to 7 are block diagrams of a backlight unit of a display device according to an exemplary embodiment of the present invention.

Figure 4:
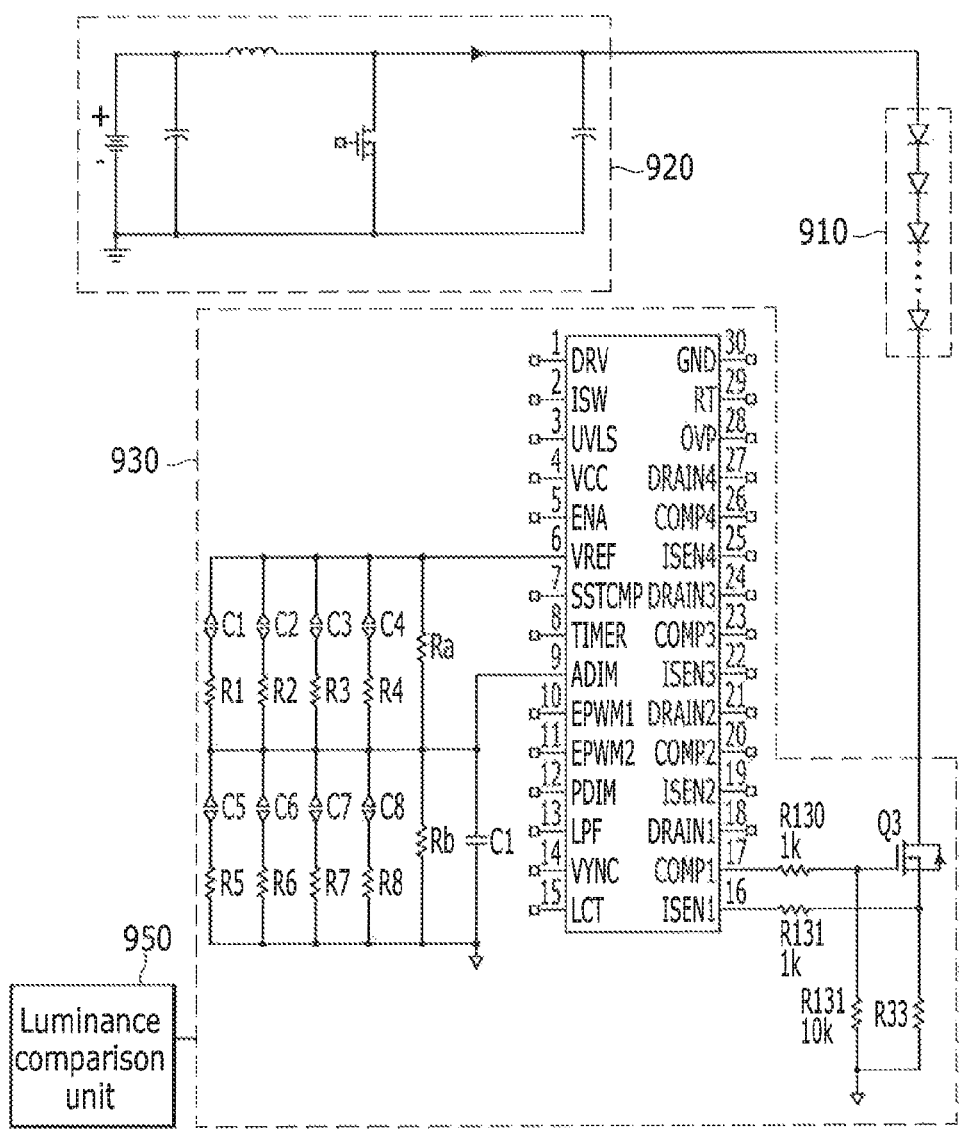
FIGS. 4 to 7 are block diagrams of a backlight unit of a display device according to an exemplary embodiment of the present invention.

Referring to FIG. 4, the backlight unit of the display device according to an exemplary embodiment of the present invention includes the light source unit 910, the DC-DC converter 920, the driving current controller 930, and the luminance comparison unit 950, as described above.

The driving current controller 930 may be made of an integrated circuit chip (IC chip) including a plurality of terminals 1 to 30. The driving current controller 930 further includes a plurality of resistors R1 to R8 and coupling members C1 to C8. The plurality of coupling members C1 to C8 is connected to a corresponding one of the plurality of resistors R1 to R8 to control a connection state of each of the resistors R1 to R8.

For example, the plurality of resistors R1 to R8 may be connected between the sixth terminal 6 and the ninth terminal 9 of the IC chip. The sixth terminal 6 is a reference voltage terminal, and the ninth terminal 9 is an output current terminal. For example, by controlling a resistance value between the reference voltage terminal (e.g., sixth terminal 6) and the output current terminal (e.g., ninth terminal 9), the driving current may be controlled.

The resistance value between the reference voltage terminal (e.g., sixth terminal 6) and the output current terminal (e.g., ninth terminal 9) is determined according to a connection existence of the coupling members C1 to C8. For example, the coupling members C1 to C8 may be connected by soldering. If the first coupling member C1 is connected, the first resistors R1 may be connected between the sixth terminal 6 and the ninth terminal 9 of the IC chip. The plurality of resistors R1 to R8 may have different values, and the connection existence of the coupling members C1 to C8 is controlled to connect at least one among the plurality of resistors R1 to R8 according to the amount of the driving current change and thus, the resistance value between the reference voltage terminal and the output current terminal may be controlled.

For example, the resistance value between the reference voltage terminal and the output current terminal may be controlled by appropriately connecting the corresponding connecting coupling members C1 to C8 according to Table 2. When increasing the driving current by 5%, the first coupling member C1 may be connected and thus, the resistance value between the reference voltage terminal and the output current terminal may be decreased. In addition, when decreasing the driving current by 5%, the fifth coupling member C5 may be connected and thus, the resistance value between the reference voltage terminal and the output current terminal may be increased.

TABLE 2

| Current increasing/ decreasing amount | C1 | C2 | C3 | C4 | C5 | C7 | C8 | C9 |
|---|---|---|---|---|---|---|---|---|
| +5% | ● | ○ | ○ | ○ | ○ | ○ | ○ | ○ |
| +10% | ○ | ● | ○ | ○ | ○ | ○ | ○ | ○ |
| +15% | ○ | ○ | ● | ○ | ○ | ○ | ○ | ○ |
| +20% | ○ | ○ | ○ | ● | ○ | ○ | ○ | ○ |
| −5% | ○ | ○ | ○ | ○ | ● | ○ | ○ | ○ |
| −10% | ○ | ○ | ○ | ○ | ○ | ● | ○ | ○ |
| −15% | ○ | ○ | ○ | ○ | ○ | ○ | ● | ○ |
| −20% | ○ | ○ | ○ | ○ | ○ | ○ | ○ | ● |

The case including eight resistors has been described, however the present invention is not limited thereto, and more resistors may be included to more finely control the increasing/decreasing of the current. In addition, a less number of resistors may be included.

Figure 5:
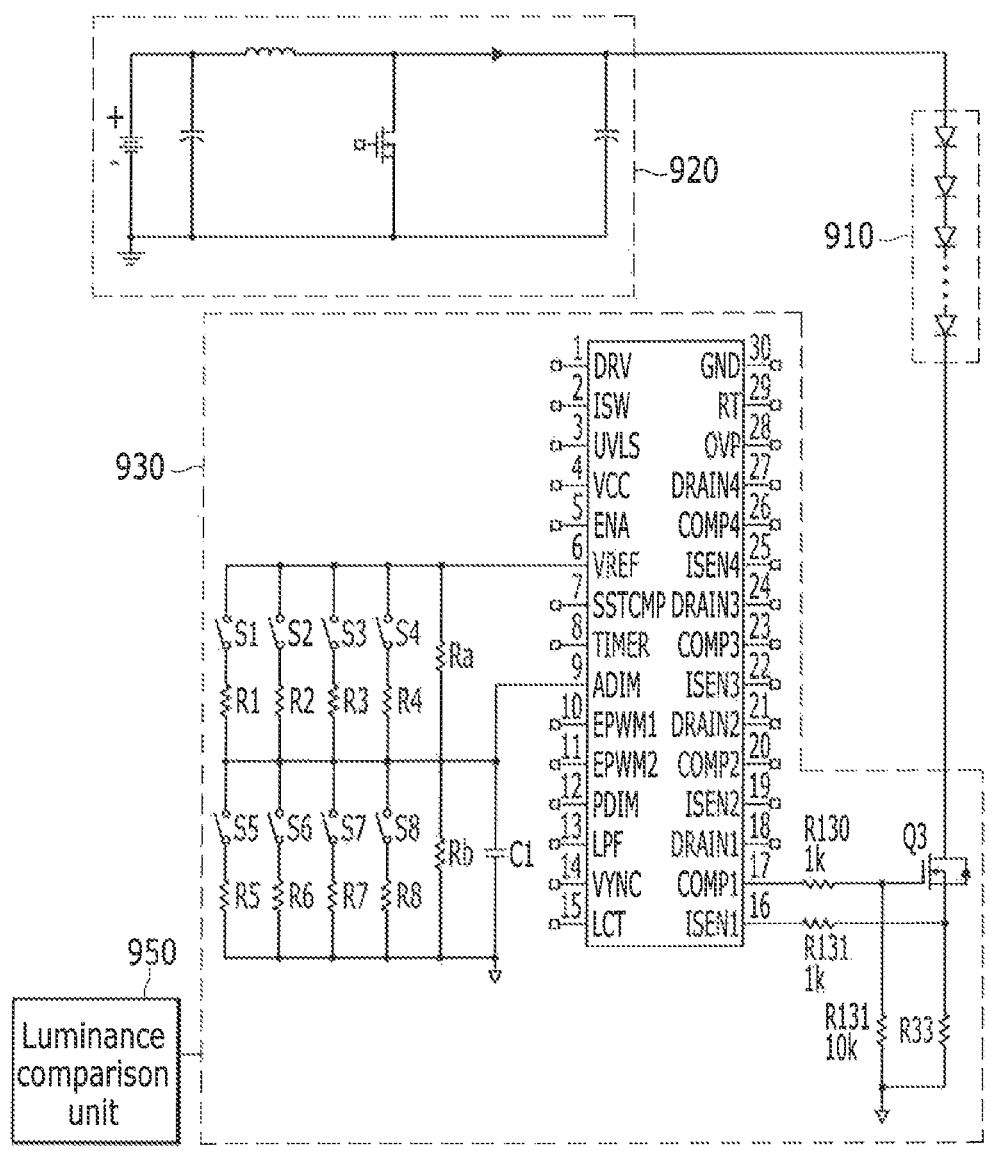

As shown in FIG. 5, the coupling members C1 to C8 of FIG. 4 may be formed of switches S1 to S8, respectively. The switches S1 to S8 may be thin film transistors, and on/off of the switches S1 to S8 is controlled to connect at least one among the plurality of resistors R1 to R8 according to the amount of the driving current change and thus, the resistance value between the reference voltage terminal and the output current terminal may be controlled. For example, when increasing the driving current by 5%, the first switch S1 may be connected (e.g., switched on) and thus, the resistance value between the reference voltage terminal and the output current terminal may be decreased. When decreasing the driving current by 5%, the first switch S1 may be connected (e.g., switched on) and thus, the resistance value between the reference voltage terminal and the output current terminal may be increased.

Figure 6:
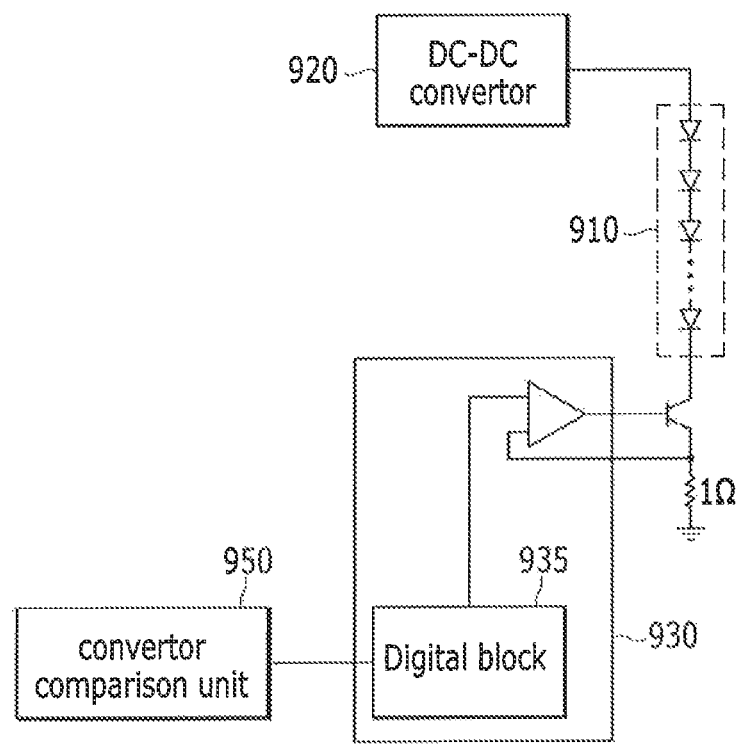

As shown in FIG. 6, the driving current controller 930 may include a digital block 935 that receives the amount of the driving current change as a digital value and controls the driving current. The luminance comparison unit 950 compares the measured luminance with the reference luminance range to calculate and convert the amount of the driving current change into the digital value, and to transmit the converted digital value to the digital block 935. The digital block 935 maintains, increases, or decreases the driving current based on the transmitted digital value.

Figure 7:
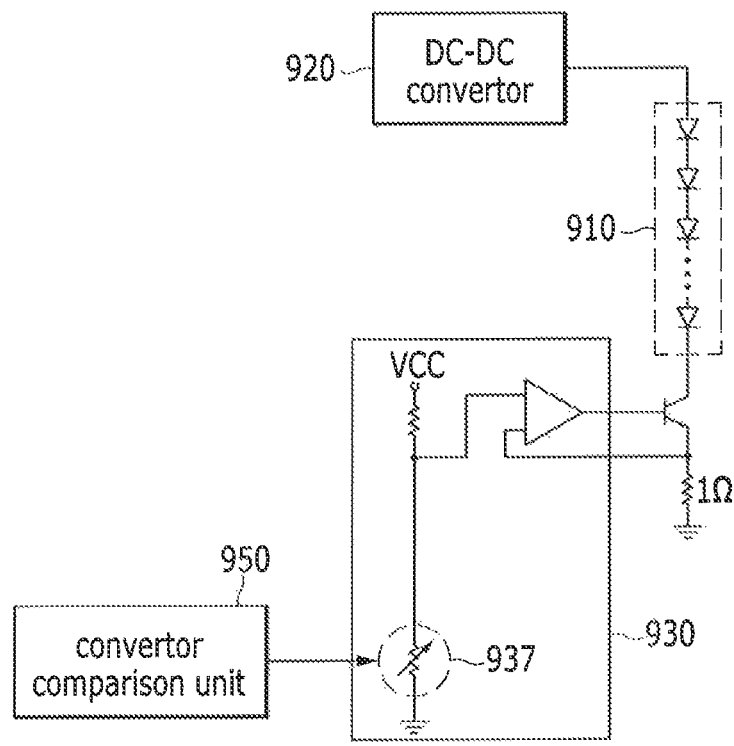

As shown in FIG. 7, the driving current controller 930 may include a digital variable resistor (DVR) 937 that controls the resistance according to the amount of the driving current change. The resistance may correspond to the driving current. For example, the digital variable resistor 937 decreases the resistance to increase the driving current. In addition, the digital variable resistor 937 increases the resistance to decrease the driving current. Thus, the driving current may be controlled by the resistance of the digital variable resistor 937. The method illustrated in FIG. 7 is similar to the analog method described in FIG. 4 and FIG. 5 except that the method illustrated in FIG. 7 is a digital method.

Hereinafter, a multi-display device according to an exemplary embodiment of the present invention will be described with reference to FIG. 8.

Figure 8:
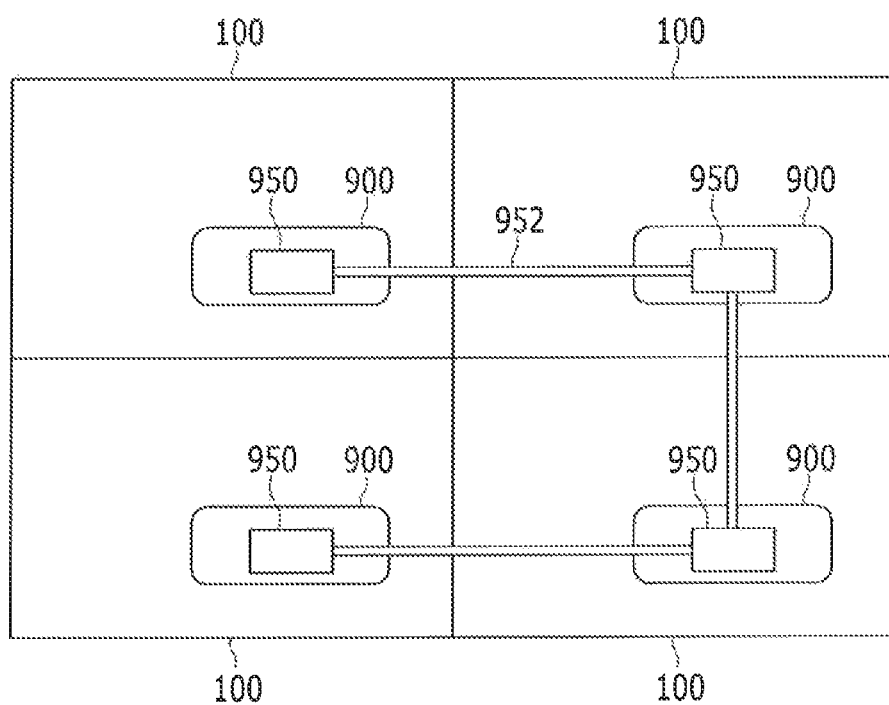
FIG. 8 is a block diagram of a multi-display device according to an exemplary embodiment of the present invention.

FIG. 8 is a block diagram of a multi-display device according to an exemplary embodiment of the present invention.

The multi-display device according to an exemplary embodiment of the present invention includes a plurality of display devices 100 disposed in a matrix shape. For example, two display devices 100 are disposed in a horizontal direction and two display devices 100 are disposed in a vertical direction, and thus one multi-display device may be formed through four display devices 100. The arrangement shape of the multi-display device illustrated in FIG. 8 is one example, and the present invention is not limited thereto. For example, more or less display devices 100 may be disposed in various shapes.

Each display device 100, as shown in FIGS. 1 and 2, includes the display panel, the signal controller, and the backlight unit 900, and the backlight unit 900 includes the light source unit, the DC-DC converter, the driving current controller, and the luminance comparison unit 950.

The luminance comparison unit 950 compares the measured luminance of the display panel and the reference luminance range, and the driving current controller controls the driving current that flows to the light source unit according to the comparison result.

The reference luminance ranges of the plurality of display devices 100 have the same value. For example, the highest value and the lowest value of the reference luminance range of each display device 100 may be equal to each other in the plurality of display devices 100. Accordingly, although the plurality of display devices 100 have different luminance characteristics, the plurality of display devices 100 may be controlled for the luminance of each display device 100 to be included within the predetermined reference luminance range. Thus, a multi-display device may represent a constant luminance.

An actual luminance of each display device 100 is measured, and the luminance comparison unit 950 of each display device 100 compares the measured luminance with the reference luminance range and calculates the amount of the driving current change. In this case, the amount of the driving current change may be different for each display device 100. Based on each amount of the driving current change, the driving current flowing to the light source unit of each display device 100 may be maintained, increased, or decreased.

For example, when a driving current flowing to the light source units of all display devices 100 is respectively 100 mA, a luminance of the display device 100 positioned at the left upper side may be 450 nit, and a luminance of the display device 100 positioned at the right upper side may be 500 nit. In addition, a luminance of the display device 100 positioned at the left lower side may be 400 nit, and a luminance of the display device 100 positioned at the right lower side may be 550 nit.

If the reference luminance is 500 nit, driving currents flowing to the light source unit of the display devices 100 positioned at the left upper side and the left lower side may be increased to increase the actual luminance. In this case, the amount of increasing the driving currents flowing to the light source units of the display devices 100 positioned at the left upper side and the left lower side may be controlled to be different from each other. In addition, driving currents flowing to the light source unit of the display device 100 positioned at the right lower side may be decreased to decrease the actual luminance. Accordingly, the driving current of all display devices 100 may be controlled for the actual luminance of all display devices 100 to have a similar value, for example, 500 nit.

The luminance comparison units 950 of a plurality of display devices 100 may be connected to each other and thus, the reference luminance ranges of the plurality of display devices 100 may be the same. The luminance comparison units 950 of the plurality of display devices 100 may be connected by a connecting member 952. For example, the luminance comparison unit 950 may be mounted to the IC chip to connect one terminal of the IC chip of each display device 100 to each other. The same reference luminance range may be shared through the connections between the luminance comparison units 950.

The luminance comparison units 950 of the plurality of display devices 100 may have the different reference luminance range. In this case, one display device 100 among the plurality of display devices 100 may be predetermined as a master and the other display devices 100 may be predetermined as slaves. The slave display devices 100 share a reference luminance range of the master display device 100 and thus, all display devices 100 have the same reference luminance range.

The display device, the multi-display device including the same, and the driving method of the display device according to an exemplary embodiment of the present invention control the driving current flowing to the light source unit, thereby constantly controlling the luminance characteristic.

Although the present invention has been described with reference to exemplary embodiments thereof, it will be understood that the present invention is not limited to the disclosed embodiments.

What is claimed is:

1. A display device, comprising:
a display panel;
a backlight unit configured to supply light to the display panel; and
a luminance comparison unit configured to compare a measured luminance of the display panel with a reference luminance range,
wherein the backlight unit includes:
a light source unit;
a DC-DC converter directly connected to a first port of the light source unit and not directly connected to a second port of the light source unit, and configured to supply a driving voltage to the light source unit through the first port; and
a driving current controller connected to the second port of the light source unit, and configured to control a driving current flowing to the second port of the light source unit based on the comparison result of the luminance comparison unit,
wherein the driving current controller includes:
a plurality of resistors connected to a reference voltage terminal of an integrated circuit (IC) chip; and
a plurality of coupling members connected to the plurality of resistors, respectively, and to an output current terminal of the IC chip,
wherein the plurality of coupling members is configured to control connection states of the resistors.

2. The display device of claim 1, wherein the driving current controller is configured to maintain the driving current when the measured luminance is within the reference luminance range, and the driving current controller is configured to change the driving current when the measured luminance is out of the reference luminance range.

3. The display device of claim 2, wherein the driving current controller is configured to decrease the driving current when the measured luminance is higher than a highest value of the reference luminance range, and the driving current controller is configured to increase the driving current when the measured luminance is lower than a lowest value of the reference luminance range.

4. The display device of claim 2, wherein the luminance comparison unit includes a lookup table having an amount of the driving current change depending on a difference between the measured luminance and the reference luminance range.

5. The display device of claim 4, wherein the luminance comparison unit is configured to transmit a first value corresponding to the amount of the driving current change to the driving current controller based on the lookup table when the measured luminance is out of the reference luminance range.

6. The display device of claim 5, wherein the light source unit includes one or more light emitting diodes (LED).

7. The display device of claim 5, wherein the one or more LEDs are arranged in series.

8. The display device of claim 5, further comprising a luminance measuring unit configured to measure the luminance of the display panel and to provide the measured luminance to the luminance comparison unit.

9. The display device of claim 5, wherein the luminance comparison unit is disposed in the backlight unit.

10. The display device of claim 5, further comprising
a signal controller configured to generate a control signal to drive the display panel, and
the luminance comparison unit is disposed in the signal controller.

11. The display device of claim 1, wherein each of the coupling members is a switch.

12. A multi-display device, comprising a plurality of display devices disposed adjacent to each other, wherein each of the display devices includes:
a display panel;
a backlight unit configured to supply light to the display panel; and
a luminance comparison unit configured to compare a measured luminance of the display panel and a reference luminance range,
wherein the backlight unit includes:
a light source unit;
a DC-DC converter directly connected to a first port of the light source unit and not directly connected to a second port of the light source unit, and configured to supply a driving voltage to the light source unit through the first port; and
a driving current controller connected to the second port of the light source unit, and configured to control a driving current flowing to the light source unit based on the comparison result of the luminance comparison unit,
wherein the driving current controller includes:
a plurality of resistors connected to a reference voltage terminal of an integrated circuit (IC) chip; and
a plurality of coupling members connected to the plurality of resistors, respectively, and to an output current terminal of the IC chip,
wherein the plurality of coupling members is configured to control connection states of the resistors.

13. The multi-display device of claim 12, wherein the plurality of display devices has the same reference luminance range.

14. The multi-display device of claim 13, wherein the luminance comparison units of the plurality of display devices are connected to each other to share the same reference luminance range.

15. A method for driving a display device, comprising:
receiving a measured luminance of the display panel;
determining whether the measured luminance is included within a reference luminance range;
maintaining a driving current flowing to a light source unit of a backlight unit in the display device when the measured luminance is included in the reference luminance range; and
changing the driving current when the measured luminance is out of the reference luminance range,
wherein the backlight unit further includes:
a DC-DC converter directly connected to a first port of the light source unit and not directly connected to a second port of the light source unit, and configured to supply a driving voltage to the light source unit through the first port; and
a driving current controller connected to the second port of the light source unit, and configured to control a driving current flowing to the second port of the light source unit based on the whether the measured luminance is included within the reference luminance range,
wherein the driving current controller includes:
a plurality of resistors connected to a reference voltage terminal of an integrated circuit (IC) chip; and
a plurality of coupling members connected to the plurality of resistors, respectively, and to an output current terminal of the IC chip,
wherein the plurality of coupling members is configured to control connection states of the resistors.

16. The method of claim 15, wherein the driving current is decreased when the measured luminance is higher than a highest value of the reference luminance range, and the driving current is increased when the measured luminance is lower than a lowest value of the reference luminance range.

17. The method of claim 16, further comprising calculating an amount of the driving current change based on a difference between the measured luminance and the reference luminance range.

* * * * *